UNITED STATES PATENT OFFICE.

JAMES P. GAY, OF CINCINNATI, OHIO.

IMPROVED COMPOSITION FOR LUBRICATING WAGON-AXLES, &c.

Specification forming part of Letters Patent No. 37,746, dated February 24, 1863.

*To all whom it may concern:*

Be it known that I, JAMES P. GAY, of the city of Cincinnati, in the county of Hamilton and State of Ohio, have invented or produced a new and useful composition of matter for lubricating the axles of wheel-vehicles and for other purposes, which composition I have denominated "Gay's Improved Wagon-Tar;" and I do hereby declare the following to be a full, clear, and exact description of the ingredients thereof, and the mode of compounding the same.

In the preparation of stearic acid for candles a peculiar substance is produced called "candle-pitch." The nature of this substance is indicated in some measure by its name. It is a dark pitchy mass left in the still after distilling fatty acids. When cold it is intensely black, lustrous, and brittle. It combines readily with animal oils, also with petroleum or coal-oil, acquiring, when mixed with fluid oils, a consistency resembling Carolina tar. For the purpose of lubricating wagon or carriage axles, and especially for heavy vehicles—such as gun-carriages, marine-railway carriages, &c.—it is believed to be, when appropriately combined, as herein specified, even superior to Carolina tar.

The mode of preparing my improved wagon-tar is as follows: For use in winter take three parts candle-pitch and one part petroleum or lard-oil, and, after warming the ingredients together, mix and incorporate them thoroughly. Any of the fixed oils, it is believed, will combine with the candle-pitch; but as the compound which I have devised is for lubricating it will be proper to use only such oil or oils as are in their nature appropriate for the purpose. For use in the summer, or when the tar is to be employed upon very heavy carriage-axles where greater density is required, increase the proportion of candle-pitch to the oil.

It is to be understood that the office of the oil is simply to reduce the candle-pitch to a suitable and convenient consistency for the use to which it is applied, and although in practice I use either petroleum or lard-oil, I do not restrict myself to these, nor to any particular kind of oil. Any fluid oil which is not in its nature inappropriate to be used as a lubricator may be used in this composition. The relative cheapness and convenience of the various oils to the manufacturer will, as a general rule, indicate the kind of oil to be used.

Candle-pitch has heretofore been applied to but few useful purposes, and, being abundantly produced, it is an inexpensive substance, and hence may be very appropriately employed for the purpose herein provided.

Having described my improved composition, what I claim as new, and desire to secure by Letters Patent, is the following:

The improved wagon-tar herein described, consisting of the ingredients specified, combined substantially in the manner and in the proportions herein stated.

JAMES P. GAY.

Witnesses:
   J. B. ELLIOTT,
   D. L. REID.